United States Patent
Lindsay et al.

(10) Patent No.: US 9,803,726 B2
(45) Date of Patent: *Oct. 31, 2017

(54) QUICK RELEASE AUTOMATIC TENSIONING MOTOR BASE AND WEAR INDICATOR

(71) Applicant: Regal Beloit America, Inc., Beloit, WI (US)

(72) Inventors: David Lindsay, Union, KY (US);
Edward Bees, Lebanon, OH (US);
Thomas Copanas, Lebanon, OH (US)

(73) Assignee: Regal Beloit America, Inc., Beloit, WI (US)

( * ) Notice: Subject to any disclaimer, the term of this patent is extended or adjusted under 35 U.S.C. 154(b) by 554 days.

This patent is subject to a terminal disclaimer.

(21) Appl. No.: 14/158,991

(22) Filed: Jan. 20, 2014

(65) Prior Publication Data
US 2015/0204425 A1 Jul. 23, 2015

(51) Int. Cl.
*F16H 7/14* (2006.01)
*F16M 11/20* (2006.01)
*F16H 7/08* (2006.01)

(52) U.S. Cl.
CPC ........... *F16H 7/14* (2013.01); *F16M 11/2092* (2013.01); *F16H 2007/0842* (2013.01)

(58) Field of Classification Search
CPC ......... F16H 7/14; F16M 11/2092; H02K 5/26
(Continued)

(56) References Cited

U.S. PATENT DOCUMENTS

| 1,508,326 A | * | 9/1924 | Hensley | A47B 21/04 |
| | | | | 248/681 |
| 1,758,646 A | * | 5/1930 | Brown | B41J 29/04 |
| | | | | 248/681 |

(Continued)

FOREIGN PATENT DOCUMENTS

JP 2011-127735 6/2011

OTHER PUBLICATIONS

International Search Report and Written Opinion dated Apr. 16, 2015 in corresponding International Patent Application No. PCT/US2014/070818 (twelve pages).

*Primary Examiner* — William E Dondero
*Assistant Examiner* — Mark K Buse
(74) *Attorney, Agent, or Firm* — Harness, Dickey & Pierce, P.L.C.

(57) ABSTRACT

A quick-release automatic tensioning motor base for supporting a motor. The motor is operably coupled to a device to be driven via a drive belt. The motor base includes at least two base brackets and at least one guide rail fixedly coupled between the base brackets. A platform assembly, which supports the motor, is slidably coupled to the guide rail for movement there along. A spring assembly is selectively coupled between the base brackets and fixedly coupled to the platform assembly. The spring assembly applies a biasing force to the platform assembly to maintain a belt tension along the drive belt. A quick-release assembly selectively engages the spring assembly and the at least two base brackets to permit movement of the quick-release assembly between a first position to retain the spring assembly and a second position to release the spring assembly to permit movement of the platform assembly.

17 Claims, 8 Drawing Sheets

(58) Field of Classification Search
USPC .......... 474/111, 115, 117; 248/681; 403/353
See application file for complete search history.

(56) References Cited

U.S. PATENT DOCUMENTS

| | | | | |
|---|---|---|---|---|
| 2,278,708 A * | 4/1942 | Miller | ................ | B21D 53/36 |
| | | | | 411/522 |
| 2,833,597 A * | 5/1958 | Sloyan | ................ | F16C 29/00 |
| | | | | 248/657 |
| 3,346,126 A * | 10/1967 | Bloom | ............. | A47B 57/487 |
| | | | | 211/192 |
| 3,586,273 A * | 6/1971 | Sloyan | ................ | F16M 7/00 |
| | | | | 248/657 |
| 4,252,380 A * | 2/1981 | Sloyan | ................ | F16C 29/02 |
| | | | | 248/657 |
| 4,786,119 A * | 11/1988 | Smuda | ............... | A47B 17/00 |
| | | | | 108/159.11 |
| 6,123,314 A * | 9/2000 | Steele | ................ | F16B 5/0642 |
| | | | | 248/222.11 |
| 6,349,890 B1 * | 2/2002 | Godsey | ................ | B02C 4/06 |
| | | | | 241/231 |
| 7,413,371 B2 * | 8/2008 | Arnold | ................ | B60R 22/18 |
| | | | | 403/315 |
| 7,604,307 B2 * | 10/2009 | Greenwald | ............ | A47B 88/08 |
| | | | | 312/333 |
| 8,720,761 B2 * | 5/2014 | Binder | ................ | B60R 9/04 |
| | | | | 224/309 |
| 8,910,917 B1 * | 12/2014 | Bees | ................ | B60R 9/04 |
| | | | | 248/657 |
| 2011/0237373 A1 * | 9/2011 | Barrios | ................ | F16H 7/14 |
| | | | | 474/113 |
| 2011/0278912 A1 | 11/2011 | Schlanger | | |

* cited by examiner

QUICK RELEASE AUTOMATIC TENSIONING MOTOR BASE AND WEAR INDICATOR

FIELD

The present disclosure relates to a motor base for use with roof-top HVAC units and other V-belt applications and, more particularly, relates to a motor base having a quick release automatic tensioning system and optional wear indicator system.

BACKGROUND

This section provides background information related to the present disclosure which is not necessarily prior art.

Motor bases are often used to support a drive motor coupled to an accessory, such as a heating, ventilation, and air conditioning (HVAC) unit, via a drive belt. Drive belts typically connect an output shaft of the drive motor to an input shaft of the accessory to be driven. It is well understood that the tension of the drive belt is paramount to maximize drive efficiency, reduce downtime due to maintenance and/or repair, and minimize associated maintenance requirements. It is also understood that by maintaining proper belt tension, system wear components, such as the belt itself, motor bearing, and other items, benefit from increased service life.

Determining the proper belt tension is often described as being that which is just enough to drive the maximum anticipated load without slippage. In other words, the proper belt tension can be described as the level at which one obtains maximum drive efficiency while imposing minimum stress on the belt, bearings, and components of the driven member. Presence of tension beyond this "proper belt tension" can result in unnecessary stresses imposed on the belt, bearing, and remaining components thereby resulting in premature failure. On the other hand, presence of tension below this "proper belt tension" results in belt slippage, heat, and loss of available power. The slippage and heat can unnecessary accelerate wear of the belt and pulleys.

Motor bases have been developed to permit the tension of the belt extending from the motor mounted to the motor base to the accessory to be driven to be adjusted to obtain the proper belt tension. Such motor bases can generally be described as i) fixed-position adjustable bases, which can be manually adjusted by a technician, allow adjustment by manually altering the center distance between driver and driven pulleys (or "sheaves," for V-belt drives), or ii) automatic-position adjustable bases, which include tension-controlling bases having internal or external devices to change pulley center distance automatically as the machine runs and as load conditions require.

Unfortunately, the use of fixed adjustable bases does not permit real-time adjustment of belt tension as load varies, which can lead to increased belt wear and/or reduced available power. The alternative is to employ the automatic-position adjustable base that automatically adjusts the center distance between pulleys as load requirements demand, while the system runs.

In some previous embodiments, a motor can be bolted to the carriage, which is free to move. Turning an adjustment screw causes the follower nut, spring, and carriage to move away from the driven pulley. After the belt is installed, further screw rotation moves the carriage until the belt is snug. Continued rotation causes the follower nut to compress the spring. The spring, in turn, exerts a force on the carriage, which results in tension being applied to the belt. The force exerted by the spring equals the total tension in the belt; both forces act upon the carriage in opposite directions, and the carriage is free to move to a neutral position where all forces balance—the free body is in equilibrium.

Springs for spring-loaded bases can be sized by the manufacturer. Adjustments are made on site as the motor runs at the prevailing load. As load increases, belt tension increases until it exceeds the spring force. The spring then compresses and the carriage moves toward the driven pulley. As this happens, the increased spring force becomes equal to the increased belt tension. Whatever distance the carriage travels equals the additional distance the spring is compressed. Conversely, when belt tension decreases because the load lightens, the force of the relaxing spring moves the carriage away from the driven pulley. This results in belt tension being maintained at a value just sufficient to keep the system operating at peak efficiency—with neither slippage nor excessive tension.

However, it has been found that during maintenance periods, the use of a conventional automatic-position adjustable base may result in excessive time consumption. That is, to reduce the center distance of the system, the adjustment screw must be turned (opposite installation) to a sufficient degree to permit removal of the existing belt and installation of a new belt. Often times, it has been found that in order to avoid such tedious and time consuming operation of turning the adjustment screw (which can, in some applications, require up to 100 cycles to reduce the necessary distance), technician may attempt to pry or otherwise force removal and/or installation of belts over the pulleys. This can damage the belt and the pulleys and/or sheaves used in my applications.

Therefore, in light of the desire of maintenance companies to reduce labor charges, there exists a need in the art, as determined by applicant, to provide an automatic-position adjustable base having a quick release feature to permit the safe, quick, and convenient removal and/or installation of drive belts. Moreover, there exists a need in the art, as determined by applicant, to provide a simple and convenient method for determining the wear rate and/or degree of the drive belt, sheaves, and/or pulleys. Finally, there exists a need in the art to overcome the deficiencies of the prior art.

SUMMARY

This section provides a general summary of the disclosure, and is not a comprehensive disclosure of its full scope or all of its features.

According to the principles of the present teachings, a quick-release automatic tensioning motor base for supporting a motor relative to a fixed structure is provided having advantageous construction. The motor drives a device via a drive belt. The quick-release automatic tensioning motor base includes at least two base brackets connectable to a fixed structure and at least one guide rail being fixedly coupled between the at least two base brackets. The motor base further includes a platform assembly slidably coupled to the at least one guide rail for movement along the at least one guide rail relative to the at least two base brackets. The platform assembly is configured to support and retain the motor thereon. A spring assembly is provided that is selectively coupled between the at least two base brackets and fixedly coupled to the platform assembly for movement therewith. The spring assembly applies a biasing force to the platform assembly to automatically maintain a predetermined belt tension along the drive belt. A quick-release assembly having a quick-release member selectively engageable between the spring assembly and the at least two base brackets is also provided. The quick-release assembly is positionable in a first position to retain the spring assembly to at least one of the at least two base brackets and a second position to release the spring assembly from the at least two base brackets.

In some embodiments, the quick-release assembly includes a pivoting quick-release member. In some embodiments, the quick-release assembly includes a linearly-translating quick-release member. In some embodiments, a wear indicator system can be used to monitor the wear of the drive belt.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
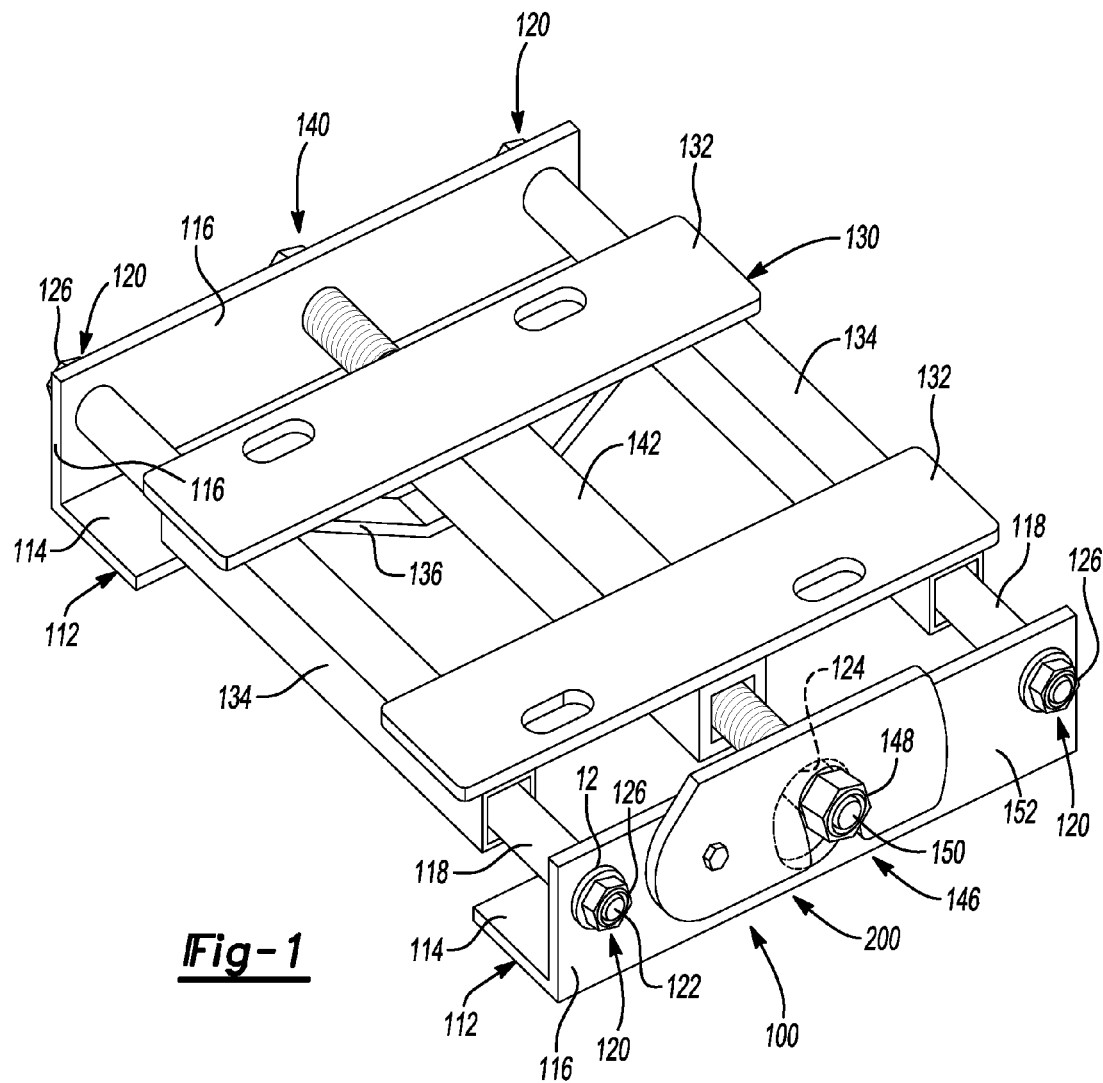
FIG. 1 is a perspective view of a quick-release automatic tensioning motor base according to some embodiments of the present teachings.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
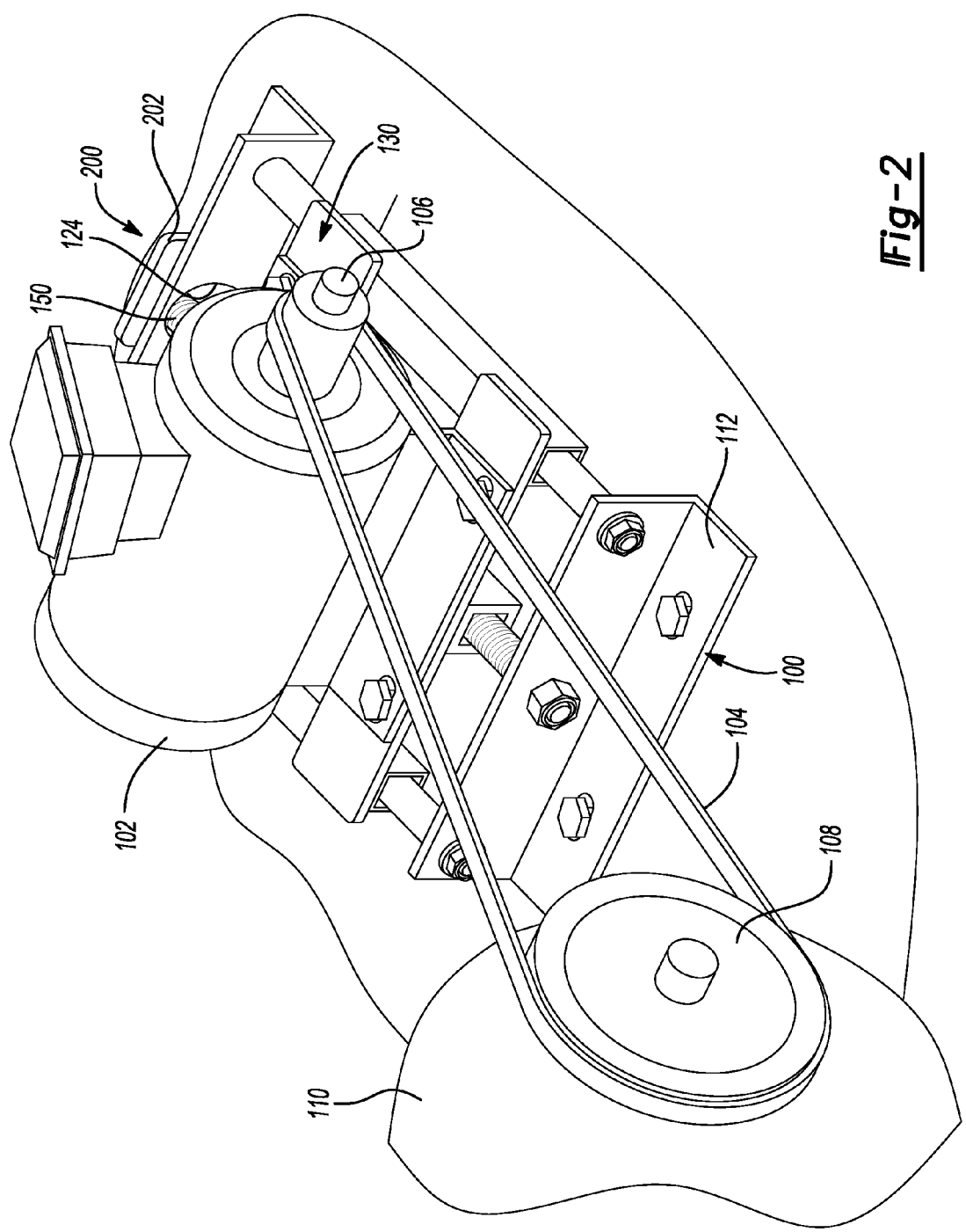
FIG. 2 is a perspective view of the quick-release automatic tensioning motor base of the present teachings in use with a motor and device to be driven.

With reference to FIGS. 1 and 2, an automatic-position adjustable base 100 is illustrated for supporting a motor 102 thereupon and maintaining a proper belt tension of a drive belt 104 extending between an output shaft or pulley 106 of motor 102 and an input shaft or pulley 108 of a device to be driven 110. As will be described, automatic-position adjustable base 100 is operable to be spring-biased to maintain a predetermined belt tension along drive belt 104 during operation. This belt tension can be maintain in response to varying operational conditions, such as, but not limited to, operational load (e.g. centrifugal force), belt and pulley/sheave wear, belt stretch, environmental effects (e.g. heat, humidity, etc.), and the like.

To this end, automatic-position adjustable base 100 can comprise two or more angled base brackets 112 each having a base portion 114 and an upstanding portion 116 extending generally orthogonally from base portion 114. Base portion 114 can comprise one or more slots or apertures for fastening base portion 114 to a support surface, such as a floor, roof, or other location, to generally inhibit movement of base brackets 112 relative thereto. Upstanding portion 116 can comprise a plurality of apertures for receiving members there through. Specifically, automatic-position adjustable base 100 can comprise one or more guide rails 118 extending between upstanding portions 116 of based brackets 112. It should be understood that, in some embodiments, any number of guide rails can be used. In some embodiments, two or more guide rails 118 can be fixedly coupled to upstanding portions 116 via fasteners 120. Fasteners 120 can comprise any suitable fastener, such as an extended threaded portion 122 of guide rail 118 projecting through a corresponding aperture 126 formed in upstanding portion 116 and a fastening nut or head 126 threadedly engaging threaded portion 122 to apply a clamping force upstanding portion 116 of base bracket 112 to secure guide rail 118 therewith. A similar fastening system can be used at each end of guide rails 118 to secure guide rails 118 to base bracket 112. Guide rails 118 can be generally cylindrical in shape to provide a smooth bearing surface thereupon.

A platform assembly 130 can be slidably disposed on and captured by guide rails 118 for sliding movement there along. Platform assembly 130 can comprise one or more platform support members 132 being coupled to or integrally formed with guide rail sleeves 134. Platform support members 132 are sized, shaped, and configured to support motor 102 thereupon. Motor 102 can be coupled to platform support members 132 via fasteners for movement therewith.

Guide rail sleeves 134 are sized and configured to slidably engage guide rails 118 to permit sliding movement there along. In some embodiments, guide rail sleeves 134 can generally surround and generally envelope guide rails 118 to maintain engagement with guide rails 118 in all directions. In some embodiments, guide rail sleeves 134 can be generally square or rectangular shaped in cross-section to provide a generally flat surface for mating with platform support members 132. Platform assembly 130 can further comprise one or more truss supports 136 extending below platform support members 132 to provide additional loading support. Truss supports 136 can be generally V-shaped and coupled to platform support members 132, guide rail sleeves 134, and/or a junction between platform support member and a corresponding guide rail sleeve.

In some embodiments, automatic-position adjustable base 100 can comprise a spring assembly and adjustment system 140 can comprise a combined system or separate systems. In some embodiments, a spring sleeve 142 is coupled to platform assembly 130, such as coupled to platform support members 132. Spring assembly 140 can comprise a spring 144 (not shown) disposed within spring sleeve 142 for providing a biasing force to platform assembly 130 relative to base brackets 112 to urge platform assembly 130 into a position to exert a predetermined tensioning force along drive belt 104. To this end, spring assembly 140 can include the adjustment system having one or more adjustment fasteners 146. In some embodiments, adjustment fasteners 146 can comprise a fastening nut 148 threadedly engaging a threaded rod 150 extending from spring sleeve 142 and through aperture 124 of base bracket 112 to an outboard side 152 of upstanding portion 116 of base bracket 112. Fastening nut 148 can comprise a flanged base engageable with outboard side 152 of upstanding portion 116. It should be appreciated that flanged base of fastening nut 148 should be sized greater than aperture 124 to prevent passage of fastening nut 148 through aperture 124. In some embodiments, adjustment fasteners 146 can comprise an elongated threaded member having an integrally formed head. In some embodiments, the integrally formed head and fastening nut 148 can comprise an integrally formed base flange acting as an integral washer. In the interest of brevity, the present discussion will reference threaded rod 150 and fastening nut 148. However, it should be understood that threaded rod 150 can simply be the elongated thread rod portion having the integrally formed head serving as fastening nut 148.

Moreover, in some embodiments, it should be understood that fastening nut 148 can threadedly engage threaded rod 150 for movement relative thereto. Alternatively, fastening nut 148 can be coupled to threaded rod 150 to prevent relative movement of fastening nut 148 and threaded rod 150, thereby resulting in rotation of threaded rod 150 in response to rotation of fastening nut 148. To this end, rotation of fastening nut 148 can drive threaded rod 150 into spring sleeve 142.

During adjusting operation, adjustment fasteners 146 can be disposed on opposing ends of spring sleeve 142 to permit positional adjustment of platform assembly 130 relative to base brackets 112. To this end, adjustment fasteners 146 can be rotated to either rotatably drive fastening nut 148 relative to threaded rod 150 or can rotatably drive the combination of fastening nut 148 and threaded rod 150 relative to spring sleeve 142 to cause relative movement of spring sleeve 142 and base brackets 112. In some embodiments, fastening nut 148 and threaded rod 150 can rotated together (or as a single integrally formed bolt and head) to engage a nut formed within spring sleeve 142 to cause axially movement of spring sleeve 142 in response to rotation of threaded rod 150, thereby compressing or releasing spring 144 contained within spring sleeve 142. To affect proper positioning of spring sleeve 142 and, thus, platform assembly 130 relative to base brackets 112 and, thus, motor 102 relative to device to be driven 110, fastening nut 148 and/or threaded rod 150 can be articulated to achieve a predetermined belt tension along drive belt 104. Once this predetermined belt tension along drive belt 104 is achieved, on-going and real-time adjustment of belt tension is maintained by virtue of spring 144 acting upon spring sleeve 142. The size and shape of spring 144, and thus the associated biasing force, can be chosen in light of the drive belt to be used, the desired belt tension, and other operational parameters.

As can be appreciated, in some embodiments as illustrated in FIGS. 3-7, a quick-release assembly 200 can be used such that platform assembly 130 can be easily, conveniently, and quickly positioned to permit the removal of drive belt 104 from pulley 106 of motor 102 and pulley 108 of device to be driven 110 and the reinstallation of a replacement drive belt 104 thereto. To this end, in some embodiments, fastening nut 148 and corresponding aperture 124 formed in upstanding portion 116 of base brackets 112 can be configured to permit the selective pass through of fastening nut 148 via aperture 124. In such configurations, a quick-release member 202 can be provided to permit selective retention of fastening nut 148 relative to aperture 124. That is, in a first position (e.g. a fastened position), quick-release member 202 can be positioned to retain fastening nut 148 relative to aperture 124 to prevent fastening nut 148 to pass through aperture 124. In a second position (e.g. a released position), quick-release member 202 can be positioned to release fastening nut 148 and permit fastening nut 148 to freely pass through aperture 124 thereby permitting free sliding movement (e.g. fore and aft) of platform assembly 130 along guide rails 118 between the opposing physical stops of base brackets 112.

Figure 3:
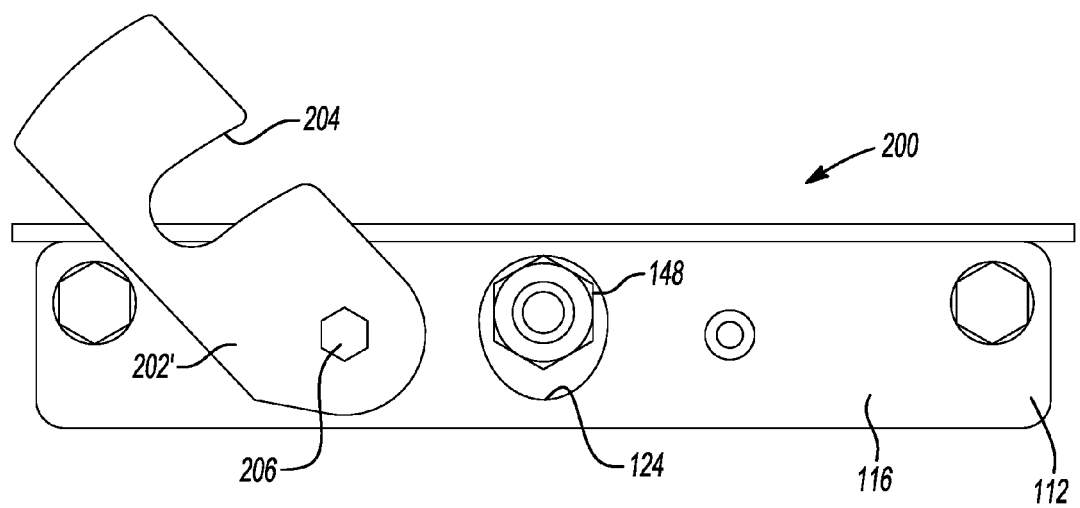
FIG. 3 is an elevated side view of the quick-release automatic tensioning motor base according to some embodiments having a pivoting quick-release member.
Figure 4A:
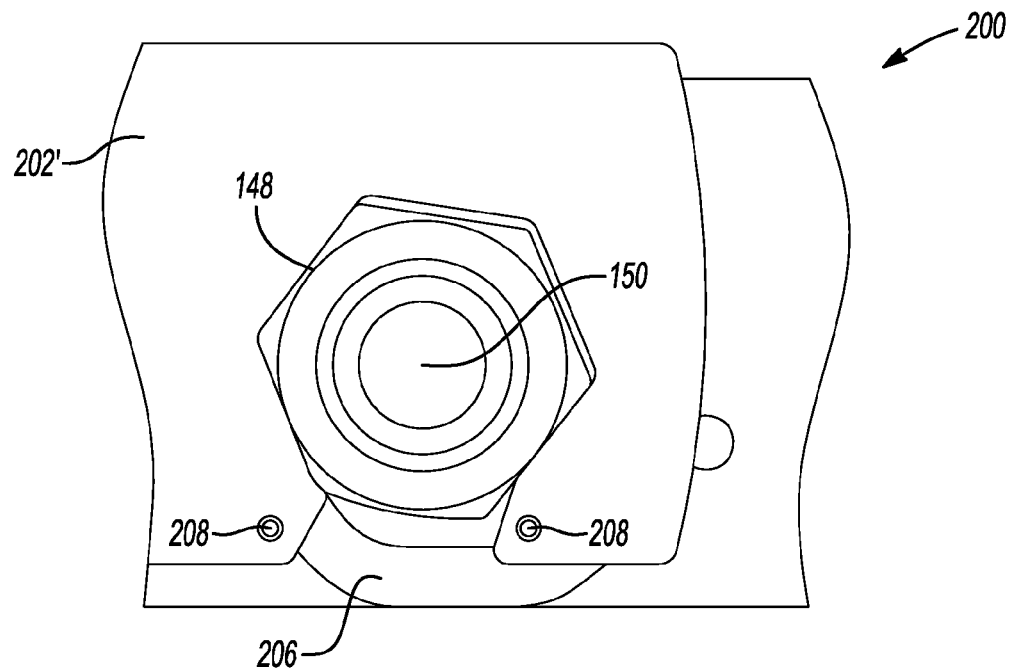
FIG. 4A is an enlarged side view of the quick-release automatic tensioning motor base having the pivoting quick-release member.
Figure 4B:
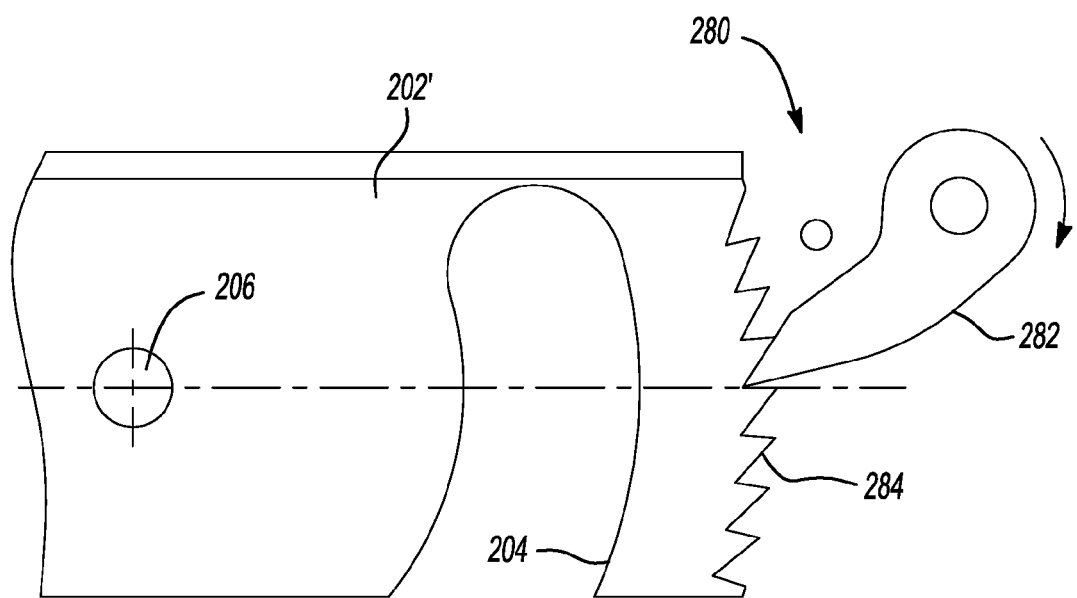
FIG. 4B is an enlarged side view of the quick-release automatic tensioning motor base having the pivoting quick-release member and a ratchet lock system.

In some embodiments, as illustrated in FIGS. 3, 4A and 4B, quick-release member 202 can comprise an articulating quick-release member 202' that is pivotally coupled to at least one base bracket 112. Articulating quick-release member 202' can comprise an arcuate retention slot 204. Arcuate retention slot 204 can define a width measured there across that is greater than a diameter of threaded rod 150 and less than a diameter of fastening nut 148 (or the enlarged flange of fastening nut 148). Articulating quick-release member 202' can be pivotally coupled to base bracket 112 via a conventional fastener 206 extending through an aperture formed in articulating quick-release member 202' and base bracket 112. Fastener 206 can serve as a pivot axis for articulating quick-release member 202'. Due to the articulating or pivoting movement of articulating quick-release member 202', arcuate retention slot 204 can be shaped to define an arc having a radius generally positioned at the pivot axis of fastener 206.

Figure 5:
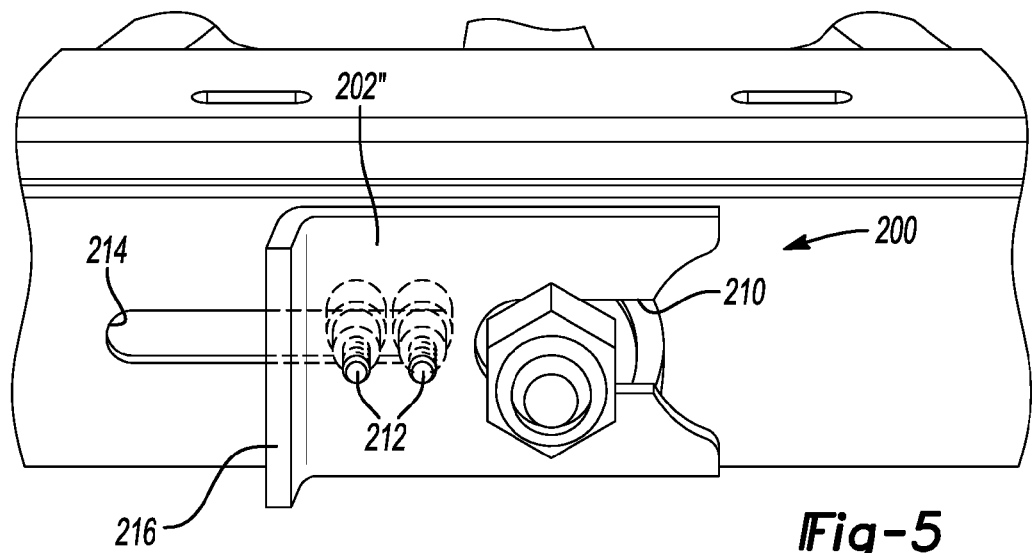
FIG. 5 is an enlarged side view of the quick-release automatic tensioning motor base according to some embodiments having a linearly-translating quick-release member in a fastened position.
Figure 6:
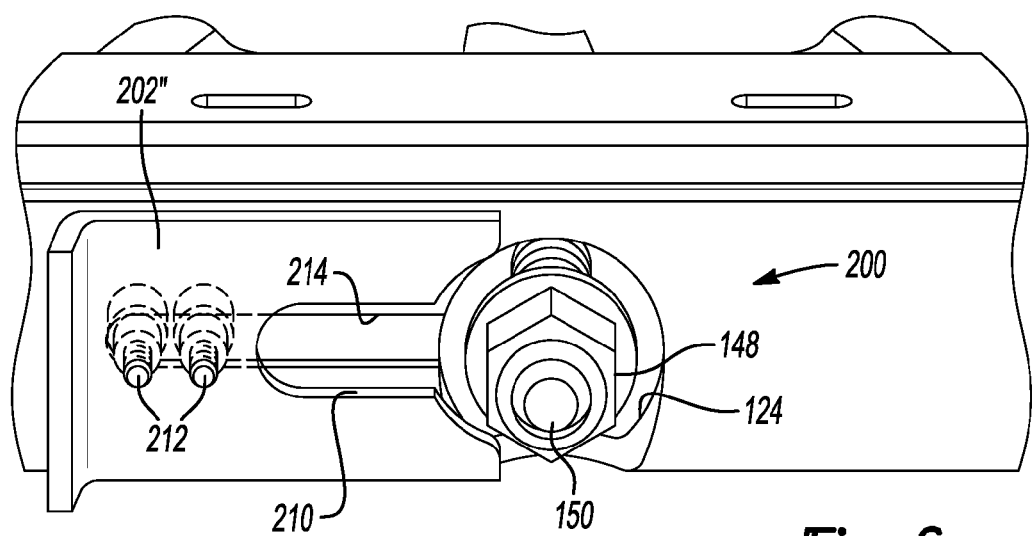
FIG. 6 is an enlarged side view of the quick-release automatic tensioning motor base according to some embodiments having a linearly-translating quick-release member in a released position.
Figure 7:
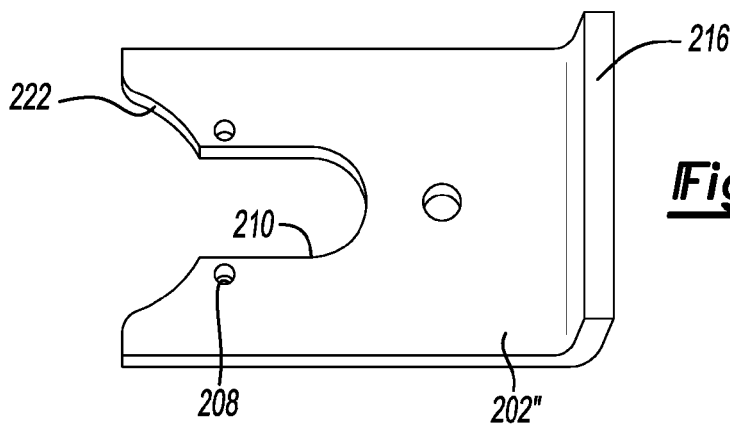
FIG. 7 is a perspective view of a linearly-translating quick-release member according to some embodiments.

In some embodiments, as illustrated in FIGS. 5-7, quick-release member 202 can comprise a linear quick-release member 202" that is slidably coupled to at least one base bracket 112. Linear quick-release member 202" can comprise a linear retention slot 210. Linear retention slot 210 can define a width measured there across that is greater than a diameter of threaded rod 150 and less than a diameter of fastening nut 148 (or the enlarged flange of fastening nut 148). Linear quick-release member 202" can be slidably coupled to base bracket 112 via one or more guide pins 212 that extend through a cam slot 214 formed in base bracket 112. Guide pins 212 can serve as a cam extending along cam slot 214. Due to the linear sliding movement of linear quick-release member 202", linear retention slot 210 can be shaped to define a generally linear path. In some embodiments, linear quick-release member 202" can further comprise an outwardly turned flange 216 to permit convenient grasping of linear quick-release member 202" and movement of linear quick-release member 202" between the first position (e.g. fastened position) and the second position (e.g. released position) as described herein in connection with general quick-release member 202.

Figure 8:
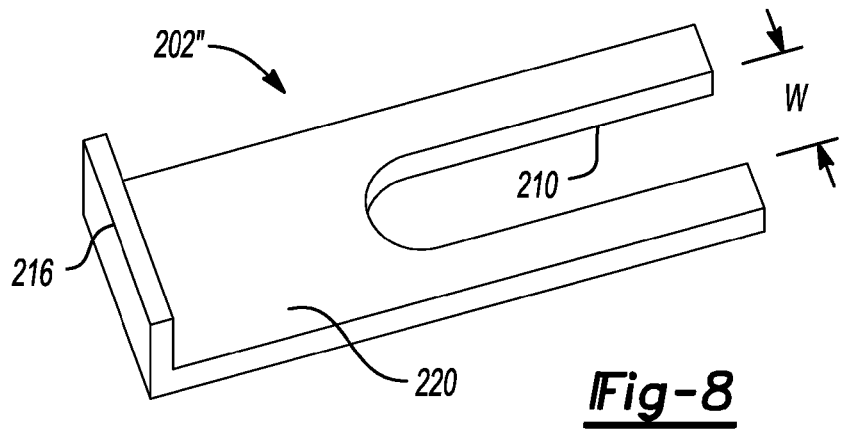
FIG. 8 is a perspective view of a linearly-translating quick-release member having a slot according to some embodiments.
Figure 9:
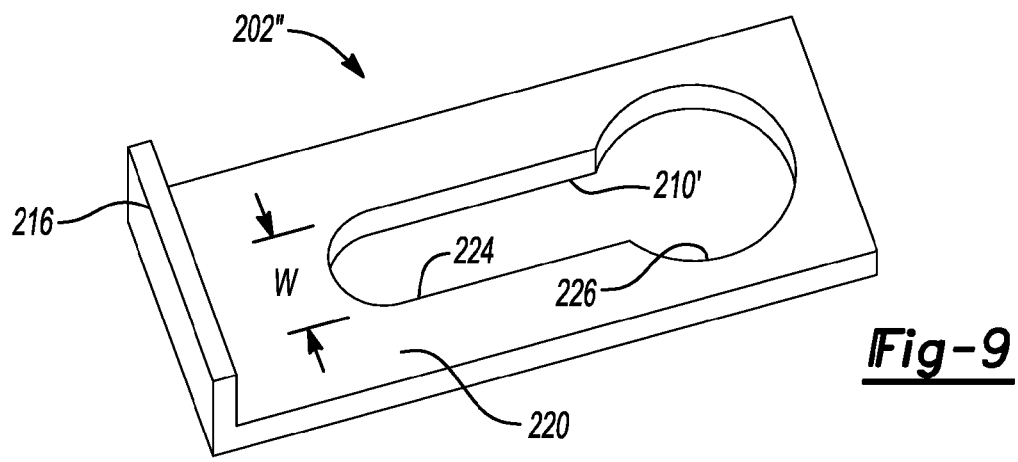
FIG. 9 is a perspective view of a linearly-translating quick-release member having a keyhole slot according to some embodiments.
Figure 10:
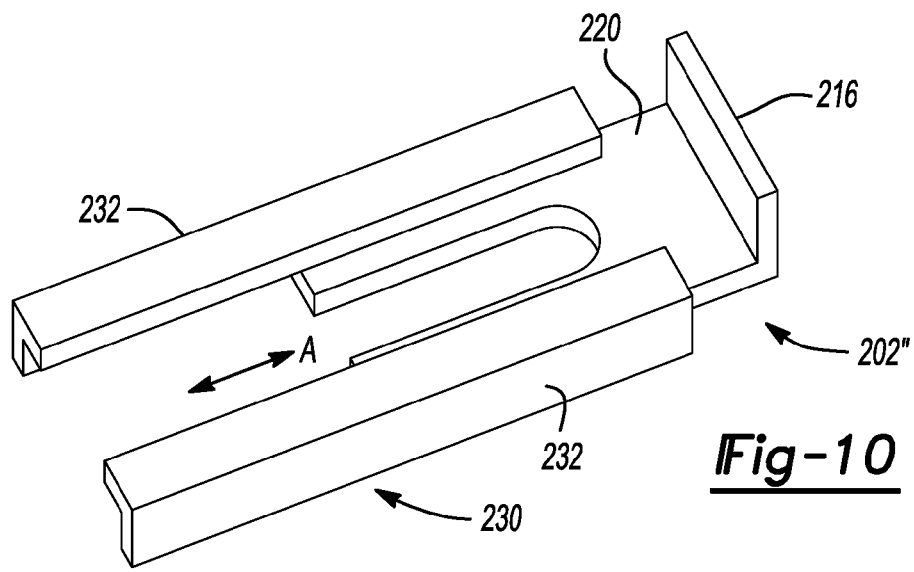
FIG. 10 is a perspective view of a linearly-translating quick-release member contained within a guide channel having a grasping portion according to some embodiments.
Figure 11A:
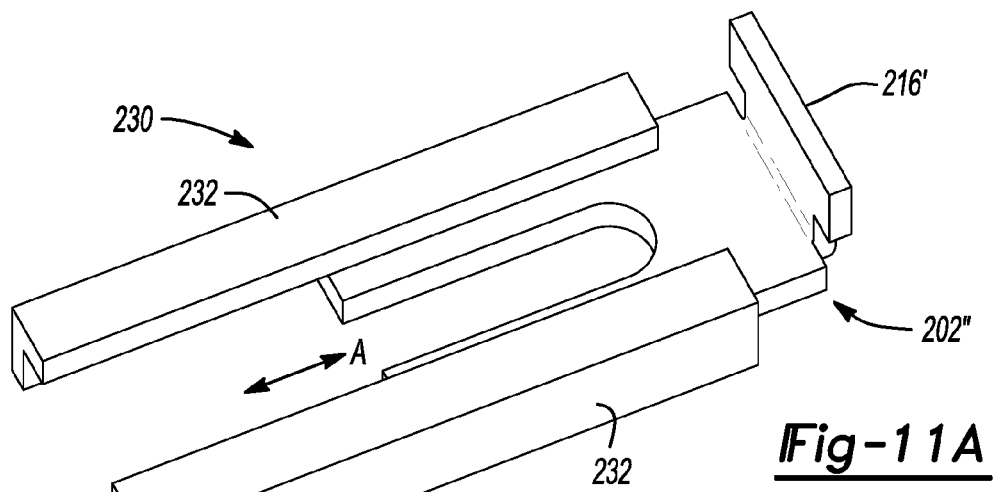
FIG. 11A is a perspective view of a linearly-translating quick-release member contained within a guide channel having a grasping portion according to some embodiments in a released position.
Figure 11B:
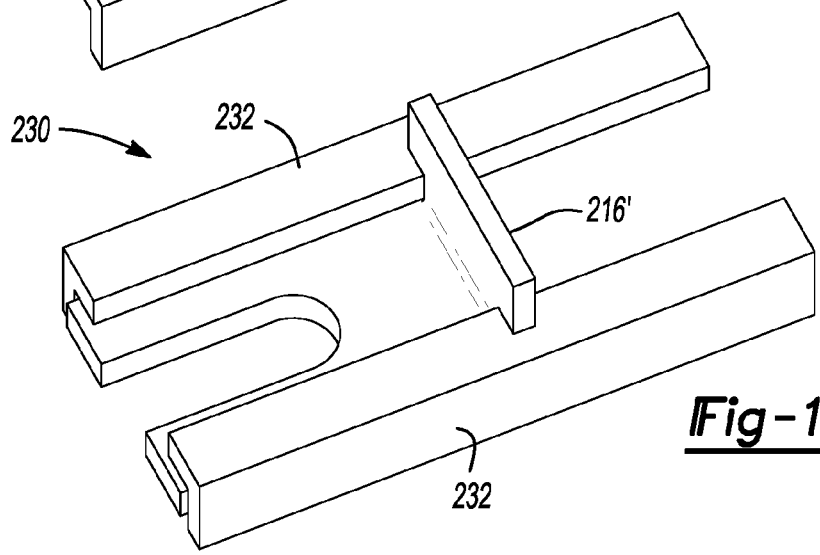
FIG. 11B is a perspective view of a linearly-translating quick-release member contained within a guide channel having a grasping portion according to some embodiments in a fastened position.
Figure 12:
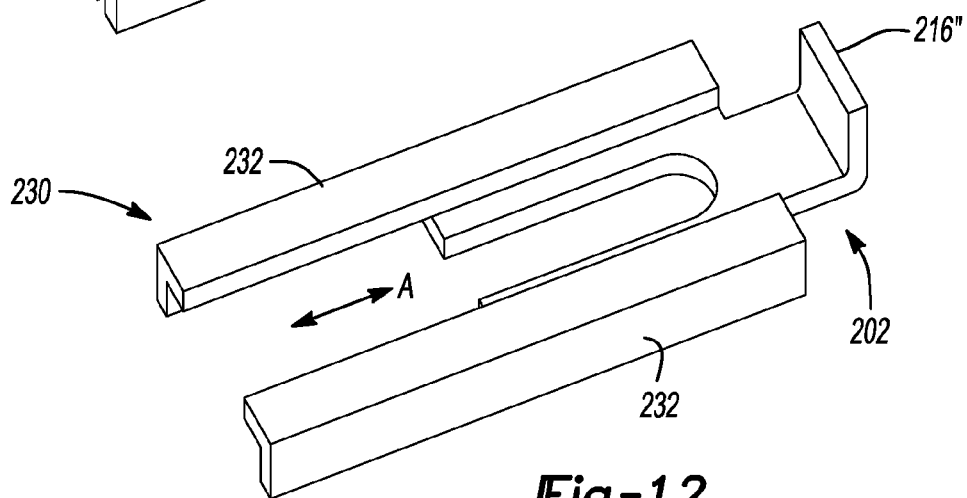
FIG. 12 is a perspective view of a linearly-translating quick-release member contained within a guide channel having a grasping portion according to some embodiments.

With reference to FIGS. 8-12, linear quick-release member 202" can comprise any one of a number of configurations sufficient to selectively reveal aperture 124 to permit fastening nut or head 126 to pass through aperture 124. In some embodiments, such as illustrated in FIG. 8, linear quick-release member 202" can comprise a generally planar member body member 220 having outwardly turned flange 216 extending therefrom. In some embodiments, as illustrated in FIGS. 10-12, outwardly turned flange 216 can be shaped in any convenient shape to permit grasping by a user. By way of non-limiting example, outwardly turned flange 216 can comprise a generally flat continuous shape (FIGS. 8-10), a T-shaped section 216', a reduced width shape 216", or alternative configuration.

With continued reference to FIGS. 7-9, linear quick-release member 202" can comprise linear retention slot 210 having any one of a number of configurations. In some embodiments, as illustrated in FIGS. 7 and 8, linear retention slot 210 can comprise an elongated slot or channel having a slot width W that is greater than a diameter of threaded rod 150 and less than a diameter of threaded nut or head 148 such that positioning of linear quick-release member 202" in the fastened position permits threaded nut or head 148 to contact and be carried (from a load perspective) by linear retention slot 210 and linear quick-release member 202". In some embodiments, linear retention slot 210 can comprise a chamfered entrance end 222 (FIG. 7) or a non-chamfered entrance end (FIG. 8).

In some embodiments, as illustrated in FIG. 9, linear retention slot 210 can comprise a keyhole slot 210' having a first slot portion 224 and an enlarged hole portion 226 being in communication with first slot portion 224. First slot portion 224 includes slot width W that is greater than a diameter of threaded rod 150 and less than a diameter of threaded nut or head 148 such that positioning of linear quick-release member 202" in the fastened position permits threaded nut or head 148 to contact and be carried (from a load perspective) by linear retention slot 210 and linear quick-release member 202". Hole portion 226 is sized to define a diameter or other shape that is larger than the diameter of threaded nut or head 148 to permit threaded nut or head 148 to pass there through when linear quick-release member 202" is in the released position.

In some embodiments, as illustrated in FIGS. 10-12, quick-release assembly 200 can comprise a guide channel 230 for capturing, supporting, and/or guiding linear translation of linear quick-release member 202". Guide channel 230 can comprise a pair of angled members 232 being inwardly directed toward each other to form a channel therebetween. An internal width of guide channel 230 can be sized to be slightly larger than an overall width of linear quick-release member 202" to permit free, yet supported movement of linear quick-release member 202" during operation along arrow A. In this embodiment, T-shaped section 216' or reduced width shape 216" can be used to provide clearance between flange 216 (216' and 216") and angled members 232 as illustrated in FIGS. 11A and 11B.

In some embodiments, as illustrated in FIGS. 4A, 4B and 7, an optional obstruction or locking feature 208, such as a roll pin, raised portion, or fastener, can be used to generally inhibit movement of quick-release member 202 from the fastened position to the released position. In some embodiments, obstruction or locking feature 208 can comprise a feature extending from a surface of quick-release member 202 that contacts threaded nut or head 148, thereby preventing further movement of quick-release member 202 toward the released position. It should be understood than any one of a number of features, devices, or systems can be used in this regard to achieve a reliably positioning of quick-release member 202 in the fastened position. In some embodiments, as illustrated in FIG. 4B, in some embodiments articulating quick-release member 202' can comprise a ratchet lock system 280 having a ratchet pawl 282 that is pivotally coupled to upstanding portion 116 of base bracket 112. Ratchet pawl 282 is sized and configured to releasably engage one or more ratchet teeth 284 of articulating quick-release member 202', thereby reliably locking articulating quick-release member 202' in the fastened position. In some embodiments, ratchet pawl 282 is spring biased into engagement with ratchet teeth 284 of articulating quick-release member 202'.

Quick-release member 202 is further sized to define a thickness sufficient to withstand the loading forces exerted upon quick-release member 202 when in the fastened position and an overall size sufficient to prevent collapse of quick-release member 202 into the enlarged aperture 124.

During operation, drive belt 104 can be easily removed and replaced according to the following procedure. In some situations, a technician can release the belt tension force being applied to drive belt 104 by either cutting the drive belt 104 or turning fastening nut 148 in a loosening direction a few turns. The loosening of fastening nut 148 of the present teachings need only be sufficient to provide enough movement of platform assembly 130 to urge platform assembly 130 toward device to be driven 110 a distance sufficient to permit quick-release member 202 to be moved from its fastened position to its released position. It should be appreciated that this movement distance (i.e. distance sufficient to permit movement of quick-release member 202 from its fastened position to its released position) is substantially less than the movement distance of motor 102 relative to device to be driven 110 to permit sufficiently reduced center to center distance of pulleys 106 and 108 to remove drive belt 104. Therefore, according to the principles of the present teachings, fastening nut 148 need only be loosened enough to permit articulating or sliding movement of quick-release member 202 into the released position. Once quick-release member 202 is in the released position, fastening nut 148 can then be freely passed through aperture 124 (whose diameter is greater than the diameter of fastening nut 148), thereby providing free sliding movement of platform assembly 130.

Once free movement of platform assembly 130 is achieved, a new drive belt 104 can be easily installed about pulleys 106 and 108 without causing damage thereto or any associated sheaves or mechanisms. Once drive belt 104 is placed on pulleys 106 and 108, platform assembly 130 can be slid to a position such that fastening nut 148 returns to a position outboard of outboard side 152 of upstanding portion 116 and quick-release member 202 can then be articulated or slid from the released position back to the fastened position. Finally, fastening nut 148 can be turned to achieve the predetermined belt tension required of the newly-installed drive belt 104. Accordingly, the present teachings provide a simple, convenient, and quick solution to remove and install a drive belt without the potential for damage to the belt, pulleys, sheaves, or other components.

Figure 13:
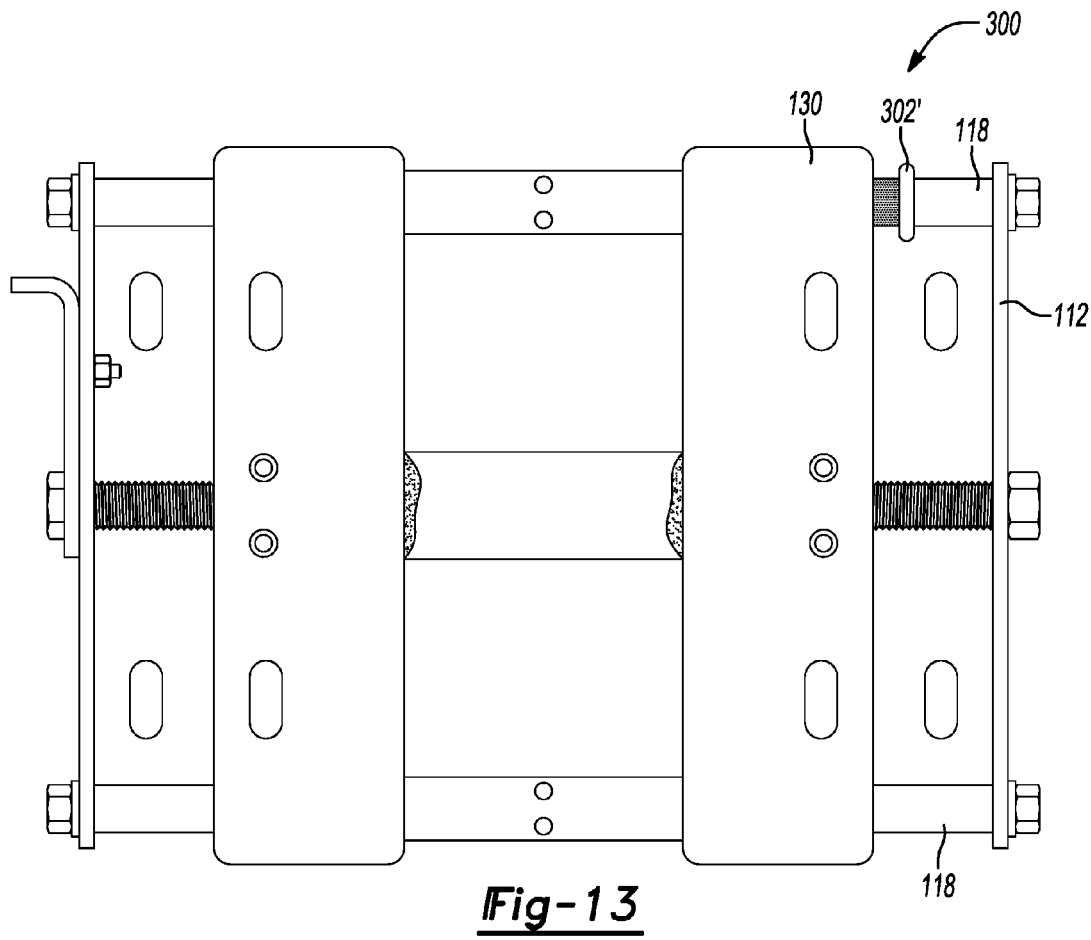
FIG. 13 is a top view of a wear monitoring system according to some embodiments of the present teachings.
Figure 14:
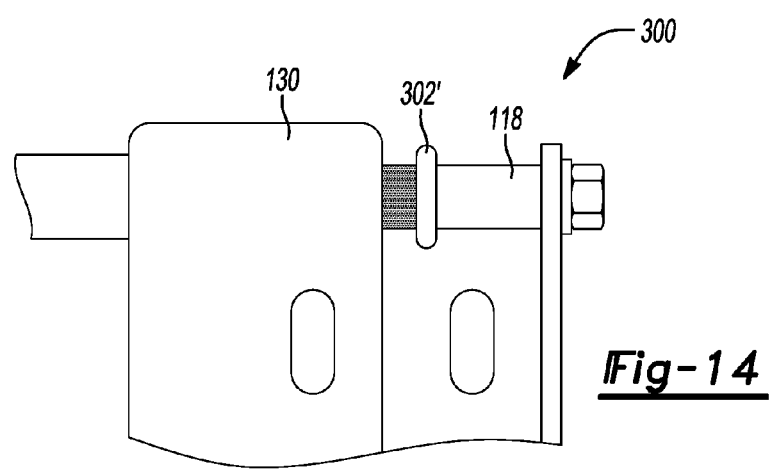
FIG. 14 is an enlarged top view of the wear monitoring system according to some embodiments of the present teachings.

In some embodiments, as illustrated in FIGS. 13 and 14, a wear indicator system 300 can be provided for use in simple, convenient, and quick monitoring of the wear of drive belt 104 and pulleys or sheaves 106 and 108. More particularly, as drive belt 104 and sheaves and pulleys 106 and 108 wear or otherwise age, belt 104 rides deeper in the grooves of pulleys or sheaves 106 and 108, requiring an increase in the distance between pulley or sheave 106 and 108 to maintain sufficient tension in belt 104 to transmit desired power and speed from motor 102 to driven device 110. As a result, platform assembly 130 slides under the biasing force of spring 144 to a second position that is different than its first or starting position. This movement is traditionally not monitored and a technician merely responds to breakage of drive belt 104 or some other noticeable factor (e.g. slippage, squeal, and the like). However, benefits can be realized through preventative maintenance and/or replacement. Therefore, in an effort to monitor the wear of drive belt 104 and pulleys or sheaves 106 and 108, wear indicator system 300 can comprise a marker member 302 for marking the initial position of platform assembly 130 along a stationary member, such as guide rail 118, base bracket 112, or other member separate from platform assembly 130. In some embodiments, marker member 302 can comprise an O-ring 302' placed along guide rail 118. O-ring 302' can be positioned in contact with platform assembly 130 during initial installation of drive belt 104. During use and resultant wear of drive belt 104, platform assembly 130 moves to maintain the predetermined belt tension, which causes platform assembly 130 to become spaced apart a distance from O-ring 302'. This distance can be used to monitor a particular installation or configuration and, at a predetermined distance, notify a technician of the need to check the condition of drive belt 104 and sheaves or pulleys 106 and 108. The change of the drive belt 104 can thus be completed quickly without the additional time typically associated with drive belt failures and response times.

It should be understood, however, that alternative wear indicator systems are anticipated. Any system that properly monitors a movement distance of platform assembly 130 can be used as a wear indicator, such as a sensor system, a lockable marker member, an imprinted scale system, and the like.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A quick-release automatic tensioning motor base for supporting a motor relative to a fixed structure, the motor driving a device to be driven via a drive belt, the quick-release automatic tensioning motor base comprising:
   first and second base brackets connectable to a fixed structure,
   a guide rail being fixedly coupled between the first and second base brackets;

a platform assembly slidably coupled to the guide rail for movement along the guide rail relative to the first and second base brackets, the platform assembly being configured to support and retain the motor thereon;

a spring assembly being selectively coupled to the first base bracket and fixedly coupled to the platform assembly for movement therewith, the spring assembly applying a biasing force to the platform assembly to automatically maintain a predetermined belt tension along the drive belt; and a quick-release assembly having a quick-release member selectively engageable between the spring assembly and the first base bracket, the quick-release assembly being positionable in a first position to couple the spring assembly to the first base bracket and a second position to release the spring assembly from the first base bracket.

2. The quick-release automatic tensioning motor base according to claim 1 wherein the quick-release member is pivotally coupled to the first base bracket to permit rotation relative thereto.

3. The quick-release automatic tensioning motor base according to claim 2 wherein the quick-release member comprises an arcuate slot, the arcuate slot sized to receive a rod of the spring assembly therein.

4. The quick-release automatic tensioning motor base according to claim 3 wherein the rod of the spring assembly comprising a fastening head, the arcuate slot having a slot width that is greater than a diameter of the rod and less than a diameter of the fastening head.

5. The quick-release automatic tensioning motor base according to claim 4 wherein the first base bracket comprises an aperture having a diameter greater than the diameter of the fastening head, the quick-release member spanning the aperture thereby preventing the fastening head from passing through the aperture in the first position, the quick-release member permitting the fastening head to pass through the aperture in the second position.

6. The quick-release automatic tensioning motor base according to claim 1 wherein the second position that releases the spring assembly from the first base bracket further releases the platform assembly for unrestricted movement between the first and second base brackets.

7. The quick-release automatic tensioning motor base according to claim 1, further comprising:

a wear indicator system being operably coupled between the platform assembly and a stationary structure, the wear indicator system being operable to indicate movement of the platform assembly relative to the stationary structure indicative of wear of the drive belt.

8. The quick-release automatic tensioning motor base according to claim 7 wherein the stationary structure is the at least one guide rail.

9. The quick-release automatic tensioning motor base according to claim 7 wherein the stationary structure is at least one of the first and second base brackets.

10. The quick-release automatic tensioning motor base according to claim 7 wherein the wear indicator system comprises a marker member marking an initial position of a relative position of the platform assembly and the stationary structure.

11. The quick-release automatic tensioning motor base according to claim 10 wherein the marker member comprises an O-ring disposed on the at least one guide rail.

12. A quick-release automatic tensioning motor base for supporting a motor relative to a fixed structure, the motor driving a device to be driven via a drive belt, the quick-release automatic tensioning motor base comprising:

first and second base brackets connectable to a fixed structure, a guide rail being fixedly coupled between the first and second base brackets;

a platform assembly slidably coupled to the guide rail for movement along the guide rail relative to the first and second base brackets, the platform assembly being configured to support and retain the motor thereon;

a spring assembly being selectively coupled to the first base bracket and fixedly coupled to the platform assembly for movement therewith, the spring assembly applying a biasing force to the platform assembly to automatically maintain a predetermined belt tension along the drive belt; and a quick-release assembly having a quick-release member selectively engageable between the spring assembly and the first base bracket, the quick-release assembly being positionable in a first position to couple the spring assembly to the first base bracket and a second position to release the spring assembly from the first base bracket, wherein the quick-release member is slidably coupled to the first base bracket to permit linear translation relative thereto.

13. The quick-release automatic tensioning motor base according to claim 12 wherein the quick-release member comprises a linear slot, the linear slot sized to receive a rod of the spring assembly therein.

14. The quick-release automatic tensioning motor base according to claim 13 wherein the rod of the spring assembly comprising a fastening head, the linear slot having a slot width that is greater than a diameter of the rod and less than a diameter of the fastening head.

15. The quick-release automatic tensioning motor base according to claim 14 wherein the first base bracket comprises an aperture having a diameter greater than the diameter of the fastening head, the quick-release member spanning the aperture thereby preventing the fastening head from passing through the aperture in the first position, the quick-release member permitting the fastening head to pass through the aperture in the second position.

16. The quick-release automatic tensioning motor base according to claim 13 wherein the rod of the spring assembly comprising a fastening head, the linear slot having a keyhole shape having a hole portion and a slot portion extending from the hole portion, a slot width of the slot portion being greater than a diameter of the rod and less than a diameter of the fastening head, a diameter of the hole portion being greater than the diameter of the fastening head.

17. The quick-release automatic tensioning motor base according to claim 16 wherein the fastening head is retained by the slot portion when the quick-release member is in the first position and is permitted to pass through the hole portion when the quick-release member is in the second position.

* * * * *